US012607714B2

(12) United States Patent
Heunisch et al.

(10) Patent No.: US 12,607,714 B2
(45) Date of Patent: Apr. 21, 2026

(54) METHOD, DEVICE, AND SYSTEM FOR IDENTIFYING THAT A FIRST RADAR UNIT IS SUBJECT TO INTERFERENCE FROM A SECOND RADAR UNIT

(71) Applicant: Axis AB, Lund (SE)

(72) Inventors: Sebastian Heunisch, Lund (SE); Santhosh Nadig, Lund (SE)

(73) Assignee: AXIS AB, Lund (SE)

( * ) Notice: Subject to any disclaimer, the term of this patent is extended or adjusted under 35 U.S.C. 154(b) by 321 days.

(21) Appl. No.: 18/432,730

(22) Filed: Feb. 5, 2024

(65) Prior Publication Data

US 2024/0264271 A1    Aug. 8, 2024

(30) Foreign Application Priority Data

Feb. 8, 2023    (EP) ..................................... 23155625

(51) Int. Cl.
*G01S 7/35*         (2006.01)
*G01S 7/41*         (2006.01)
(52) U.S. Cl.
CPC ................ *G01S 7/354* (2013.01); *G01S 7/41* (2013.01)
(58) Field of Classification Search
CPC .......... G01S 7/023; G01S 7/36; G01S 13/584; H04B 1/1027
See application file for complete search history.

(56) References Cited

U.S. PATENT DOCUMENTS

2019/0113600 A1    4/2019  Melzer et al.

2020/0072941 A1    3/2020  Jansen et al.
2020/0191911 A1    6/2020  Meissner et al.
(Continued)

FOREIGN PATENT DOCUMENTS

| CN | 101103279 A | * | 1/2008 | ............. H04K 3/228 |
|----|-------------|---|--------|------------------------|
| CN | 111427021 A |   | 7/2020 | |
| WO | WO-2018181018 A1 | * | 10/2018 | ........... G01S 13/584 |

OTHER PUBLICATIONS

Yang, Z., & Mani, A. (2022). * Interference Mitigation For AWR/IWR Devices*. Texas Instruments. SWRA662 (Year: 2022).*

(Continued)

*Primary Examiner* — Vladimir Magloire
*Assistant Examiner* — Peter Davon Doze
(74) *Attorney, Agent, or Firm* — Volpe Koenig

(57)                ABSTRACT

A method for identifying that a first FMCW radar unit is subject to parallel incoherent interference from a second FMCW radar unit is disclosed. The method comprises: acquiring a range-Doppler map, calculating a range-resolved signal for a negative half (corresponding to negative Doppler shifts) and a positive half (corresponding to positive Doppler shifts) of the range-Doppler map, and calculating a range-dependent noise profile for the range-Doppler map as, for each range interval, the smaller of the range-resolved signal for the negative half and the positive half. The method further comprises: identifying parallel incoherent interference in the range-Doppler map if a measure of a deviation between the range-resolved signal for the negative half and the positive half is smaller than a predetermined deviation threshold, and a measure of a difference between the range-dependent noise profile and a global noise floor of the range-Doppler map exceeds a predetermined noise threshold.

15 Claims, 6 Drawing Sheets

(56)     References Cited

U.S. PATENT DOCUMENTS

2021/0132185 A1      5/2021  Lin et al.
2021/0190902 A1      6/2021  Amihood et al.
2023/0333660 A1*   10/2023  Ali ........................... G01S 13/88

OTHER PUBLICATIONS

Extended European Search Report issued on Jul. 6, 2023 for European Patent Application No. 23155625.9.

* cited by examiner

100

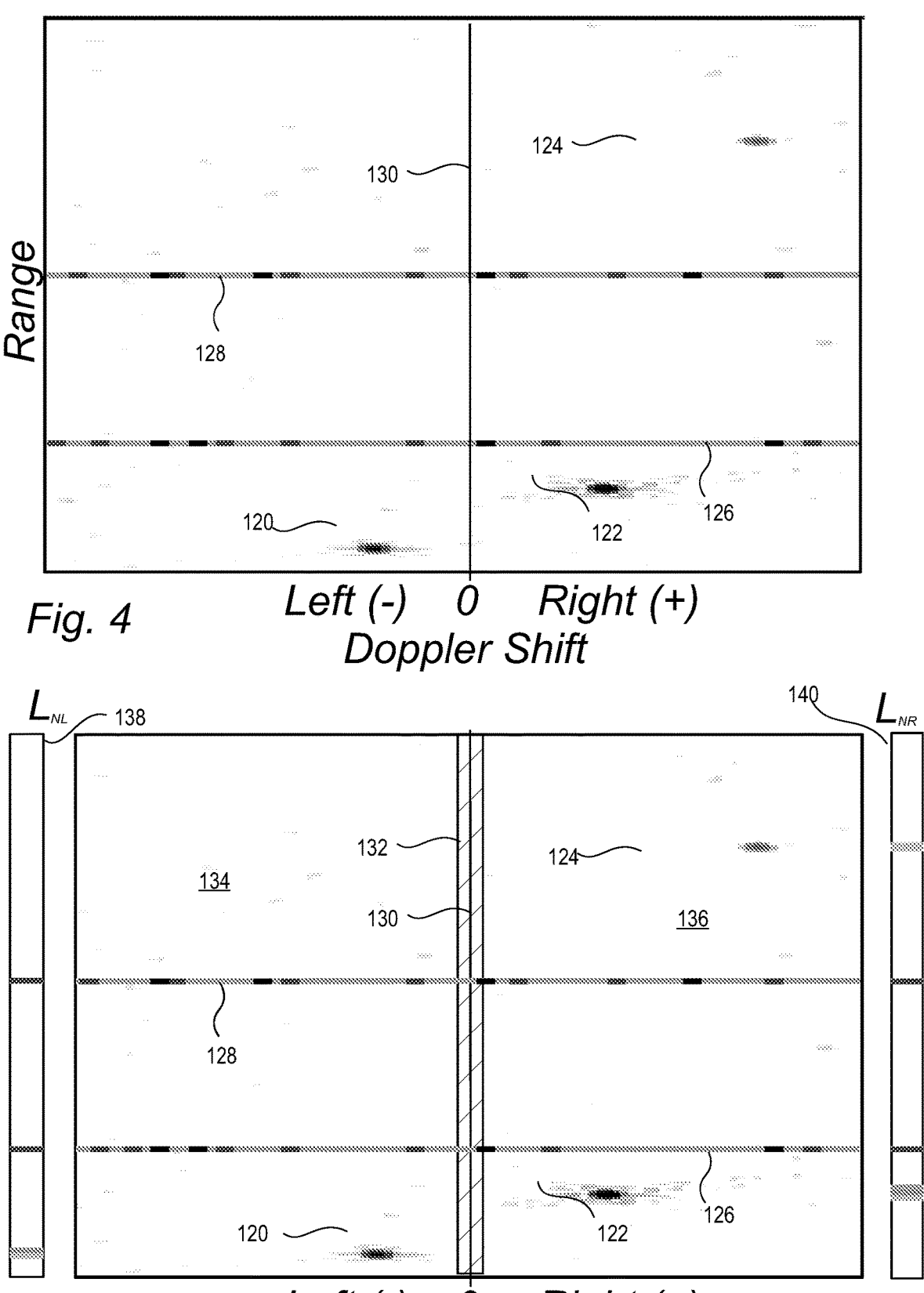
Fig. 4    Left (-)    0    Right (+)
Doppler Shift
Fig. 5    Left (-)    0    Right (+)

METHOD, DEVICE, AND SYSTEM FOR IDENTIFYING THAT A FIRST RADAR UNIT IS SUBJECT TO INTERFERENCE FROM A SECOND RADAR UNIT

TECHNICAL FIELD

The present invention relates to the field of frequency-modulated continuous-wave, FMCW, radar. In particular, it relates to a method, device, and system for identifying that a first FMCW radar unit is subject to interference from a second FMCW radar unit.

BACKGROUND

Using radar for surveillance monitoring and in vehicles becomes more and more popular as this allows the distance, velocity, and angle of objects to be measured. For example, a radar unit may be used as a complement to a surveillance camera to provide information about objects in the scene. As the use of radars becomes more common, there is an increased risk that different radars start to interfere with each other. Such incidents may occur when a radar used to monitor traffic is subject to interference from radars mounted in vehicles passing by. As a consequence of the interference, the function of the radar may worsen or completely fail in worst case. There are two distinct problems, firstly, there will be an increase in false detections if the interference is not taken care of, and secondly, true detections may be obscured by the interference.

Accidental interference where, e.g., an automotive radar of a vehicle interferes with a static radar or the automotive radar of another vehicle may be difficult to predict, at least when it comes to the timing thereof. There are several patent applications relating to detecting a minimizing the effect of such interferences.

Another situation where interferences may occur is when large areas, such as a warehouse, perimeters of a protected area, etc., are protected by a radar installation comprising several identical radar devices. There is little risk that an unknown radar source (such as a vehicle) will interfere with the installation, but the mere size of the installation will result in that the multitude of radars used pose a risk of causing interferences. In such a static installation, measures may be taken to avoid interference, which is an advantage in comparison with the previous situation. However, a drawback is that any interference that still exists after such measures have been taken will not disappear as quickly as, e.g., an automotive radar would.

For static installations it is a common approach to use time division multiplexing, i.e., that each radar is provided with an individual time slot for transmission and reception, so as to eliminate the risk of interference altogether. Another approach is frequency division multiplexing, where radars are using different frequency channels. A further approach, once there is no more room in the time domain and frequency domain is to physically isolate radar units or groups of radar units that could interfere with each other.

Another approach is to arrange and direct the radar units in such a way that it will become physically impossible for the transmission from one radar reach the receiving antennas of another. In a surveillance application, however, where full coverage of an area is desired, the concentration of radar units may render these measures insufficient for eliminating mutual interference.

The present invention aims at providing a further approach for instances where the above measures are not sufficient, alone or in combination. As such it will provide a further option, which may be used alone or in combination with the previously mentioned measures, thus enabling a powerful tool for large radar installations.

SUMMARY OF THE INVENTION

In view of the above, it is thus an object of the present invention to mitigate the above problems and provide a way of identifying that a first FMCW radar unit is subject to interference from a second FMCW radar unit, so that action can be taken to reduce the negative effects thereof.

This object is achieved by the invention as defined by the attached independent claims. Exemplary embodiments are defined by the dependent claims.

According to a first aspect, there is provided a method for identifying that a first radar unit of FMCW type is subject to parallel incoherent interference from a second radar unit of FMCW type. The method comprises:

acquiring a range-Doppler map corresponding to a time frame in which the radar unit was activated to transit and receive signals, wherein the range-Doppler map includes signal values for a plurality of range intervals and a plurality of Doppler shifts, calculating a range-resolved signal for a negative half and a positive half of the range-Doppler map, wherein the negative half and the positive half of the range-Doppler map correspond to negative and positive Doppler shifts, respectively, calculating a range-dependent noise profile for the range-Doppler map as, for each range interval, the smaller of the range-resolved signal for the negative half and the positive half, identifying parallel incoherent interference in the range-Doppler map if a measure of a deviation between the range-resolved signal for the negative half and the positive half is smaller than a predetermined deviation threshold, and a measure of a difference between the range-dependent noise profile and a global noise floor of the range-Doppler map exceeds a predetermined noise threshold.

By using this method, one is able to identify the presence of interference which is of a parallel and incoherent type. Parallel interference may appear when two FMCW radar units transmit signals, often referred to as chirps, which have an overlapping frequency range and the same slope, i.e., where the frequency of the signals increases or decreases at the same rate. Chirps having an overlapping frequency range and the same slope may also be said to be parallel. The wording parallel interference as used herein hence refers to interference caused by an aggressor radar transmitting chirp signals having an overlapping frequency range and the same slope as those of the victim radar.

The parallel interference may further be of a coherent or an incoherent type. FMCW radars typically transmit chirp signals in bursts. Coherent interference may appear if a burst of chirp signals transmitted by the aggressor radar is essentially identical to a burst of chirp signals transmitted by the victim radar. Thus, not only should the frequency range and slope of the individual chirps be the same, but so should also the time interval (idle time) between the chirps. If this is not the case, the interference is instead of an incoherent type.

Thus, while parallel interference refers to individual chirps transmitted by the two radars being identical, coherent interference refers to bursts of chirps being identical. An example when parallel incoherent interference occurs is hence when the first radar unit and the second radar unit have identical chirps (same slope, start frequency, and duration), but wherein the second radar unit has a different inter-chirp idle time than the first radar unit. The inter-chirp idle time is the time between the end of one chirp and the start of the next chirp.

The inventors have realized that interference of a parallel and incoherent type appears in the form of lines extending across the range-Doppler map in the Doppler-direction. Thus, at certain ranges, there will be elevated signal levels in the range-Doppler map which are present in about the same amount for negative Doppler shift values as for positive Doppler shift values. This is in contrast to moving targets which will result in elevated signal levels at certain ranges, but the elevated signal levels will typically only be present for either negative Doppler shift values or for positive Doppler shift values. The invention makes use of this fact to identify if there is parallel incoherent interference in a range-Doppler map. In brief, this is achieved by checking two criteria. One criterion checks for elevated signal levels in the range-Doppler map by making comparisons to a global noise floor. Another criterion checks if the elevated signal levels are present in about the same amount for negative Doppler shift values as for positive Doppler shift values. If both these criteria are met, then it is deduced that there is parallel incoherent interference in the range-Doppler map.

To check these criteria, the method first calculates a range-resolved signal for each of a negative half and a positive half of the range-Doppler map. By a range-resolved signal of a half of the range-Doppler map is meant a signal which includes one representative signal value per range interval of that half of the range-Doppler map. The range-resolved signal for each half of the range-Doppler map may be calculated as, for each range interval, a representative value of the range-Doppler signal values for that range interval and for Doppler shifts in that half. The representative value may be a mean or a median value.

The method further calculates a range-dependent noise profile, which for each range interval includes the smaller of the range-resolved signal for the negative and positive half. The range-dependent noise profile is also referred to herein as local noise or local range-dependent noise profile. By looking at the smaller value of the two halves, elevated signal levels which are due to targets are to a large degree removed since a target is typically only present in one of the halves. Left is however background noise and noise which is due to interference from other radar units, thereby making the range-dependent noise profile a measure of such noise in the current range-Doppler map as a function of range.

The first criteria of checking for elevated signal levels is carried out by comparing a measure of a difference between the range-dependent noise profile and a global noise floor of the range-Doppler map to a noise threshold. The measure of the difference between the range-dependent noise profile and the global noise floor may be a difference between a representative value, such as a mean or median, of the range-dependent noise profile and the global noise floor.

The second criteria of checking if the elevated signal levels are present in about the same amount for both halves is carried out by comparing a measure of deviation between the range-resolved signals for the left half and the right half. The measure of the deviation between the range-resolved signal for the negative half and the positive half may be a representative deviation, such as a mean or a median deviation, between the range-resolved signal for the negative half and the positive half.

As used herein, a time frame corresponds to a time period during which a burst a signals/chirps are transmitted by the radar.

The range-Doppler map also referred to as range-Doppler diagram herein is an array of signal values which each corresponds to a range interval and a Doppler shift. Sometimes, the combination of a range interval and a Doppler shift is referred to as a range-Doppler bin. A range interval may include one range value or a group of range values. A Doppler shift corresponds to a velocity. By a negative Doppler shift is meant negative velocities and by a positive Doppler shift is meant positive velocities. The negative and positive velocities are typically velocities in opposite radial directions of the first radar unit, such as towards and away from the radar unit.

Even when there are not targets in the scene and there are no interfering radar units, the signal values in range-Doppler maps acquired by the first radar unit will not be zero due to background noise, such as thermal noise in the radar unit. A measure of this noise, in the form of a single representative value, is referred to herein as the global noise floor or simply global noise. The global noise floor is hence a representative signal value (such as a mean or median value) of one or more range-Doppler maps in which there are no targets or interference. The global noise floor may be estimated as a running average value (i.e., temporal average) of a noise floor of multiple consecutive range-Doppler maps. The noise floor of a range-Doppler map may in turn be estimated by averaging the range-dependent noise profile (i.e., a range-wise average) of that range-Doppler map. By forming a temporal average, the effects of interference affecting the global noise floor estimate in the individual range-Doppler maps is reduced.

The method may further comprise:
in case no interference is identified in the range-Doppler map, detecting targets in the range-Doppler map by comparing the signal values to a predetermined detection threshold, and
in case interference is identified in the range-Doppler map, adjusting the predetermined detection threshold, and detecting targets in the range-Doppler map by comparing the signal values to the adjusted predetermined detection threshold. By adjusting the detection threshold when interference has been identified, the risk of false positive detections can be reduced, thus making the radar unit more robust to interference. The words target and object are used interchangeably herein. The predetermined detection threshold may be a constant value, or may depend on range. For example, the predetermined detection threshold may decline with range.

The step of adjusting the predetermined detection threshold may further comprise: comparing the range-dependent noise profile for the range-Doppler map to the predetermined detection threshold, and generating an adjusted detection threshold by increasing the predetermined detection threshold for range intervals where it is exceeded by the range-dependent noise profile. In this way, the detection threshold is selectively increased for range intervals where the noise caused by interference otherwise would give rise to false detections. In alternative embodiments, range intervals where the detection threshold is exceeded by the range-dependent noise profile are instead exempt from detection.

In some embodiments, the range-dependent noise profile is subjected to a low-pass filter before it is compared to the predetermined detection threshold. This has been found to lead to a detector which is more robust to noise.

In some embodiments, the comparison of the range-dependent noise profile and the predetermined detection threshold is further used to determine by how much the detection threshold should be increased. In more detail, the predetermined detection threshold may be adjusted such that it exceeds the range-dependent noise profile or a low-pass filtered version thereof.

The method may further comprise adjusting an inter-chirp idle time for the first radar unit so as to increase the likelihood of an occurrence of incoherent interference. By setting the inter-chirp idle time to be different than the inter-chirp idle time of the second radar unit, the likelihood that incoherent interference occurs increases while the likelihood of the more severe coherent interference is reduced.

According to other aspects, the invention relates to a radar unit, a radar system, and a non-transitory computer-readable medium. The features and advantages of those aspects may be the same as for the first aspect.

BRIEF DESCRIPTION OF THE DRAWINGS

The above, as well as additional objects, features and advantages of the present invention, will be better understood through the following illustrative and non-limiting detailed description of embodiments of the present invention, with reference to the appended drawings, where the same reference numerals will be used for similar elements, wherein:

FIG. 4 schematically illustrates a range-Doppler diagram resulting from a radar measurement.

FIG. 5 is the range-Doppler diagram of FIG. 4, also illustrating details being used in embodiments of the present invention.

DETAILED DESCRIPTION OF EMBODIMENTS

The invention will now be described more fully hereinafter with reference to the accompanying drawings, in which embodiments of the invention are shown. The systems and devices disclosed herein will be described during operation.

To start with, the cause and nature of the problem will be described.

Figure 1:
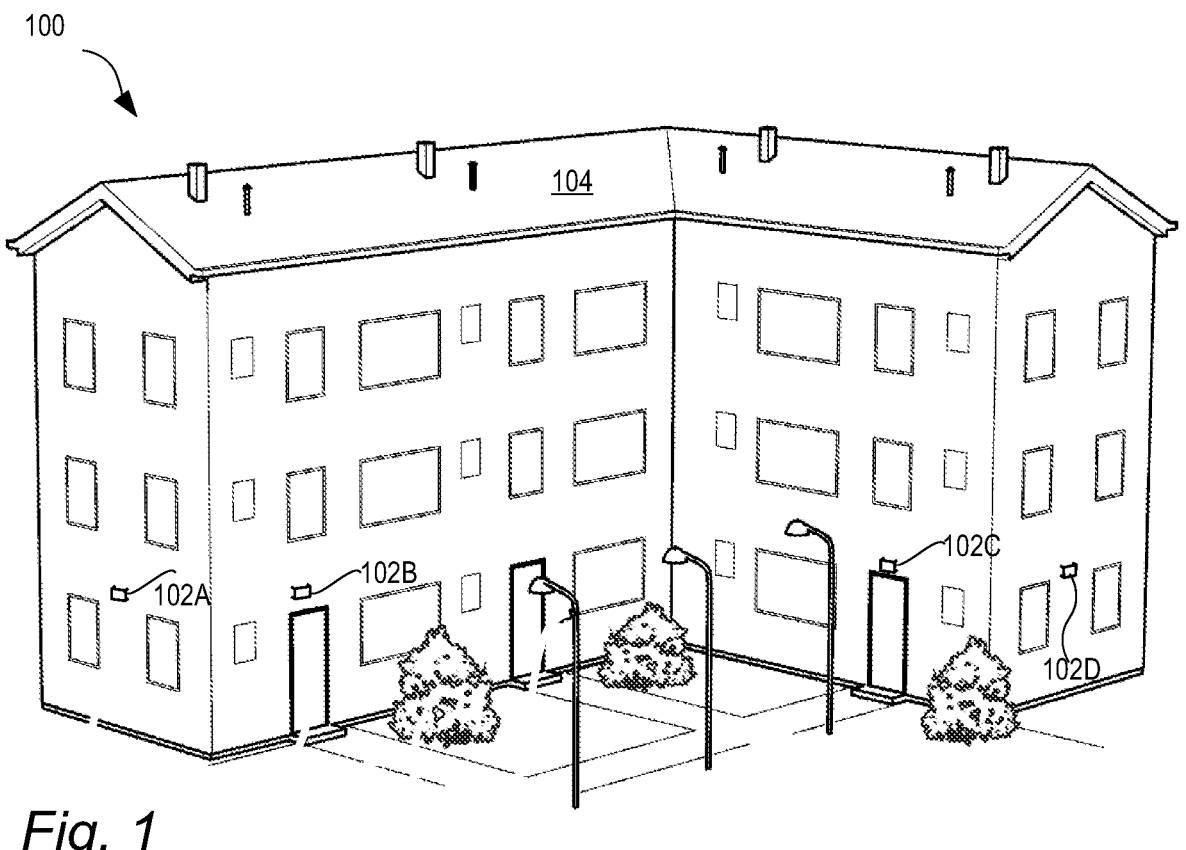
FIG. 1 schematically illustrates a radar installation comprising four radar units arranged in a scene.

FIG. 1 illustrates a radar installation 100 comprising four stationary radar units 102A-D arranged on different sides of a building 104. The radar units of the radar installation 100 have the purpose of surveilling all areas around the building 104, and in doing so their individual coverage areas will inevitably have some overlap. Also, at least some radar units will be arranged with a line of sight between each other, e.g., units 102B and 102C, and at a distance that enables interference. In this context it should be mentioned that the distance within which interference may be induced varies with the type and power of the radar unit used. For radars with shorter detection ranges, e.g., 50-100 meters, a type typically used for area protection or perimeter protection, this distance may be in the order of 300 meters. Radar systems could also be used as early warning systems, e.g., assisting an operator or a further surveillance device, such as a monitoring camera, in finding a potential intruder. Given the above, all radar units 102A-D of FIG. 1 could interfere with each other, some with a direct transmission, others via reflection or refraction.

A radar unit 102 comprises one or more transmit antennas, one or more receive antennas, signal processing circuits and other electronics and processors, as is well known.

Figure 2:
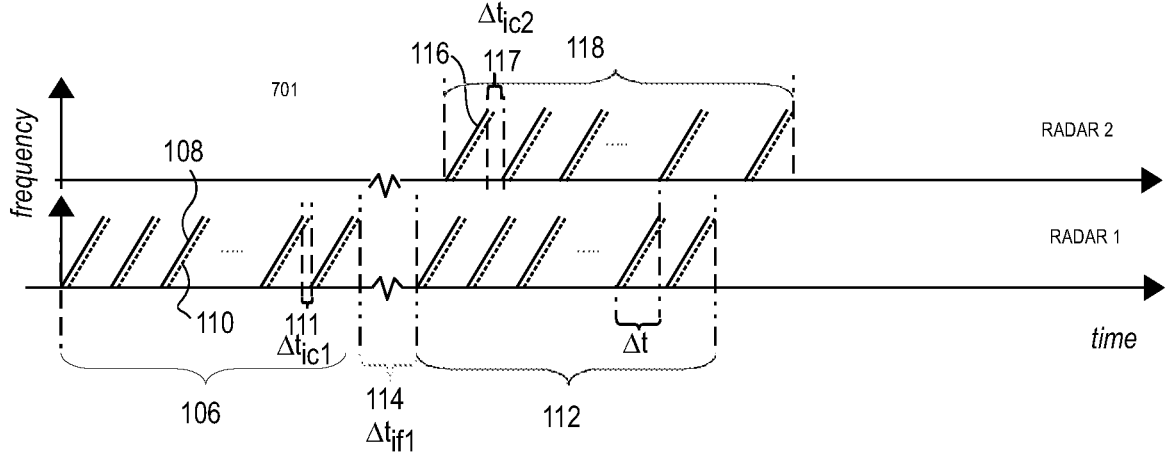
FIG. 2 schematically illustrates signals transmitted and received by two radar units.

The transmit antenna is configured to transmit sequences of signals. The sequences of signals may be transmitted in bursts during a coherent processing interval, here referred to as frames. For example, the transmit antenna may send out a sequence of signals in a first frame. Then the transmit antenna may be silent for a while before sending out a further sequence of signals in a second frame. FIG. 2 illustrates a sequence 106 of signals transmitted in a first frame, and another sequence 112 of signals transmitted in a second frame.

As mentioned in the background section a cause of interference is that one radar unit 102B transmits at the same time as another radar unit receives 102C, and since the transmitted signal is orders of magnitude larger than the received, reflected, signal the interference will be significant. One first measure is to try to time such interfering units in a way such that they transmit and receive in time slots of their own, in which way the interference will be eliminated, yet for larger radar installations that measure alone will not suffice.

To better understand the type of interference in question reference is made to the aforementioned FIG. 2. FIG. 2 illustrates the signaling of two radar units (of the same type) 102B and 102C using a chirped frequency modulation. Reference is also made to FMCW radar basics, and the following description will be brief, since the background technology is well known. In a first section 106, a first radar burst, only a first radar unit 102B is active. Each solid diagonal line 108 illustrates the frequency transmitted by the radar unit, i.e., a sinusoid whose frequency increases linearly with time—sometimes also referred to as a chirp. The dashed diagonal lines 110 illustrates the received echoed signal resulting from each chirp. When a first chirp is finalized, it is followed by an inter-chirp idle time before a second chirp is transmitted, and so forth, until a first radar burst 106 is finalized. For each chirp a beat signal (or beat frequency, or intermediate-frequency signal) may be calculated, as a mix between the transmitted and received signal. From this beat signal information regarding stationary and moving objects in the field of view of the radar may be deduced, which of course is the purpose of the radar unit.

Using Fast Fourier Transform (FFT) a range-Doppler map may be produced from the beat signals corresponding to the chirps of a frame. A range-Doppler map is essentially a graph with range (distance from the radar unit) on the y-axis and Doppler shift on the x-axis, where the Doppler shift indicates a radial velocity in relation to the radar unit. Positive Doppler shift is usually presented to the right and negative Doppler shift on the left, with zero Doppler shift in the center of the range-Doppler map. Moving objects will appear as hot spots in the range-Doppler map and their position will reveal their distance from the radar unit and their relative radial velocity in relation to the radar unit.

Figure 3:
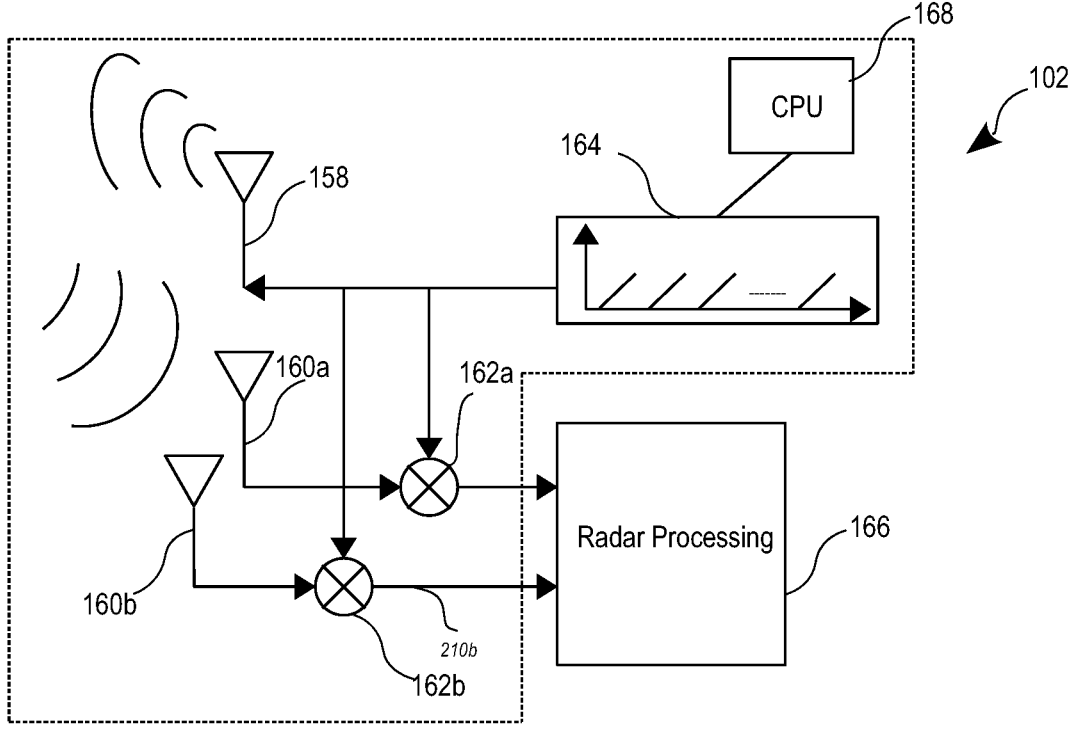
FIG. 3 schematically illustrates a radar unit.

FIG. 3 schematically illustrates a radar unit 102 and functionalities relevant for the above. When in use, the radar unit is typically stationary, such as being mounted to a wall. The radar unit 102 may be used as a complement to a video camera. For example, the radar system 102 may be included in a video camera, yet it may also be used as a standalone unit. The radar unit 102 comprises one or more transmit antennas 158, one or more receive antennas 160a and 160b, and one or more mixers 162a and 162b. The radar unit 102 may also comprise a synthesizer 164, and although data may be processed outside of the radar unit, it may also comprise radar processing means 166, which, e.g., could perform the inventive method.

The transmit antenna 158 is configured to transmit sequences of signals in bursts. The sequences of signals may be transmitted in frames. For example, the transmit antenna 158 may send out a sequence of signals in a first frame. Then the transmit antenna 158 may be silent for a while before sending out a further sequence of signals in a second frame, as previously described in relation to FIG. 2.

The first sequence of signals may be generated by the synthesizer 164, which in turn may be controlled by a control unit, such as a CPU 168.

The signals in the transmitted first sequence of signals are reflected off objects in the scene. The reflected signals are then received by each receive antenna 160a, 160b at different angles. Each receive antenna 160a, 160b hence receives a sequence of signals in response to the first sequence of signals transmitted by the transmit antenna. In addition to the reflected signals, the receive antennas 160a, 160b may receive signals which are transmitted from transmitters which are not part of the radar unit 102, such as transmitters of other radar units, thus generating the problem necessitating the invention. Those interfering signals will be superposed with the reflected signals at the receive antennas 160a, 160b. Each received sequence of signals may hence have a component stemming from the reflected signals, and another component stemming from interfering transmitters. Here two receive antennas 160a, 160b are illustrated. In practice, however, the radar unit 102 may have any number of receive antennas.

Each of the sequence of signals received by the receive antennas 160a, 160b are then mixed with the first sequence of signals by a corresponding mixer 162a, 162b. In principle, each mixer 162a, 162b mixes its input signals by calculating a product of the input signals. The output signals generated by the mixers 162a, 162b are referred to as a sequence of beat signals or intermediate frequency signals. Accordingly, a sequence of beat signals is generated for each receive antenna 160a, 160b. The mixer 162a, 162b serves to change the frequency band of its input signals. While the signal sent out by the transmitter 158 may be in the Ghz-range, the beat signals are typically in the MHz-range.

The radar processing device 166 may perform any known type of radar processing, such as frequency analysis to calculate the distance, velocity, and angle of objects in the scene. This includes range and Doppler FFT (Fast Fourier Transform, FFT), and angle digital beamforming. Specifically, the radar processing device 166 may include circuitry configured to carry out any method described herein. In a hardware implementation, the circuitry may be in the form of one or more integrated circuits, such as one or more application specific integrated circuits or one or more field-programmable gate arrays. In a software implementation, the circuitry may instead be in the form of a processor, such as a microprocessor, which in association with computer code instructions stored on a (non-transitory) computer-readable medium, such as a non-volatile memory, causes the radar processing device 166 to carry out any method disclosed herein. Examples of non-volatile memory include read-only memory, flash memory, ferroelectric RAM, magnetic computer storage devices, optical discs, and the like. This will shortly be illustrated in FIG. 4, yet first some more information in relation to FIG. 2.

The first sweep 106 is followed by a short inter-frame idle time 114 (Δtif1) and it is during this inter-frame idle time that another radar could transmit and receive without causing mutual interference. After this short idle time a second radar sweep 112 is initiated by the first radar, as illustrated by the third section in FIG. 4. In the second section a second radar unit is introduced as well. This second radar unit is of the same type as the first one and the parameters of each chirp is also the same (parameters of the frequency sweep, such as start frequency, rate of frequency change, and duration). It can be seen how the radar chirps 116 of the second radar unit's first radar sweep 118 are shifted in time by a time shift Δt in relation to those of the first radar unit, and furthermore, an inter-chirp idle time 117 (Δtic2) of the second radar unit differs from that of the first radar unit, i.e., 111 (Δtic1). In the present embodiment it is larger for the second radar unit than for the first. However, it is also obvious that there still is some overlap, meaning that the first radar will transmit when the second radar receives, and vice versa. The size of the time shift Δt and how it varies over time will affect the type of interference. If the time shift Δt is the same for each subsequent chirp, the interference is coherent and will result in a distinct peak in a range-Doppler map. If the time shift Δt varies over time and hence is different for subsequent chirps, the interference is incoherent and will instead result in lines extending in the Doppler-direction of the range-Doppler map as will be illustrated below. This will particularly be the case in the situation of FIG. 2 where the radars have chirps with identical slope, start frequency and duration, i.e., the chirps are parallel, but different inter-chirp idle times. For the purposes of the present invention the shift and variation are such that the interference is classified as parallel incoherent interference, "incoherent interference" in short.

The invention will be beneficial at any instance where incoherent interference is present, yet it will be particularly beneficial when the radar units involved are part of the same radar installation. The obvious reason for this is that the installer will have the freedom of adjusting idle-times, the time between adjacent chirps within a radar sweep etc. such as to, in instances where interference is inevitable, ensure that that the interference will be incoherent interference. The present invention will thus give the installer a further option for enabling optimal radar readings for the area, to add to some other approaches that has already been mentioned, such as the physical location/orientation of radar units and arranging radar unit to operate in individual time slots, i.e., that one radar unit operates in the inter-frame idle time of another, and vice versa.

FIG. 4 illustrates a range-Doppler diagram for the situation of FIG. 2, starting from the second section (i.e., when incoherent interference is introduced). Three signals 120, 122, 124 indicating objects are visible in the graph. The intensity of their echo will vary with their reflectivity (material, size, etc.) as well as their proximity to the radar unit. Also, while their distance (range axis) from the radar unit may be quite well defined their Doppler shift may be a bit wider. This could be a result of a signal-to-noise ratio, but it could also be useful information concerning the object. In this particular example the three objects 120, 122, 124 are three individuals walking in the surveilled scene. For each signal the torso of the individual will result in the strongest portion of the signal, and each swinging arm (and leg) will have a velocity which is either slightly higher or slightly lower than the velocity of the torso (depending on which way it is swinging at the moment), resulting in a widened profile in the Doppler shift dimension.

The incoherent interference will generate vertical lines of heightened intensity, an increased noise level, shown at 126 and 128.

This heightened intensity may be close to the signal from the actual objects, and it easy to understand that it will interfere with the identification of true objects in the scene, thus resulting in false target detections.

Starting with FIG. 5 the present invention in accordance with one embodiment thereof will be described. FIG. 5 will set some base data to start with and is in turn based on the range-Doppler map of FIG. 4. First, reflections from static objects will indicate a velocity, and thus a Doppler shift, of zero. Such objects are usually of no immediate interest from a surveillance perspective and since there will be an increased noise along the zero Doppler shift line 130 an area 132 covering this line is preferably excluded from any further processing. Second, the map is divided, for computational purposes, in a left side 134 (the negative half corresponding to negative Doppler shifts) and a right side 136 (the positive half corresponding to positive Doppler shifts). If the zero Doppler line were to be included it should be included on both sides of the calculations to follow, so as not to give a biasing addition to one side only. For each of the left 134 and the right 136 side, a representative value of the values in the range-Doppler map at that side is calculated for each range value (or group of range values forming a range interval). In this way a range-resolved signal is formed for each side or half of the range-Doppler map. The representative value may be calculated as a mean value or median value. These values are represented by the columns to the left and to the right of the range-Doppler map, 138 and 140, respectively. Other statistical measures than the mean value or the median value could be used.

The left column 138 is referred to as Local Noise Left, $L_{NL}$, and the right column 140 may be referred to as Local Noise Right, $L_{NR}$, where "local" refers to it being a noise estimate per range value.

We also define a Global Noise, $G_N$, which corresponds to a general noise floor in the range-Doppler map. As for the local noise there are several different ways of calculating the global noise. One could be to use data from $L_{NL}$ and $L_{NR}$, and use a mean or median value from these. Another could be to aggregate $L_{NL}$ and $L_{NR}$ over several frames and calculate the corresponding measures as a moving average, to ensure a robust yet dynamically responsive measure of the global noise. Instead of aggregating all values from the local noise, the lower of the two local noise values for each range could be used. In this way any biasing effect from the increased signal level associated with detected objects, however small, would essentially be eliminated. The global noise could be seen as the internal thermal noise within the receiver, but there may be more contributors to this noise as well.

One further note to make is that the noise level will vary with distance from the radar unit. For this reason, a range-noise profile, i.e., the expected value of evaluated noise as a function of distance from the radar unit, in the absence of any other interferences, will decrease with increasing distance.

Figure 6:
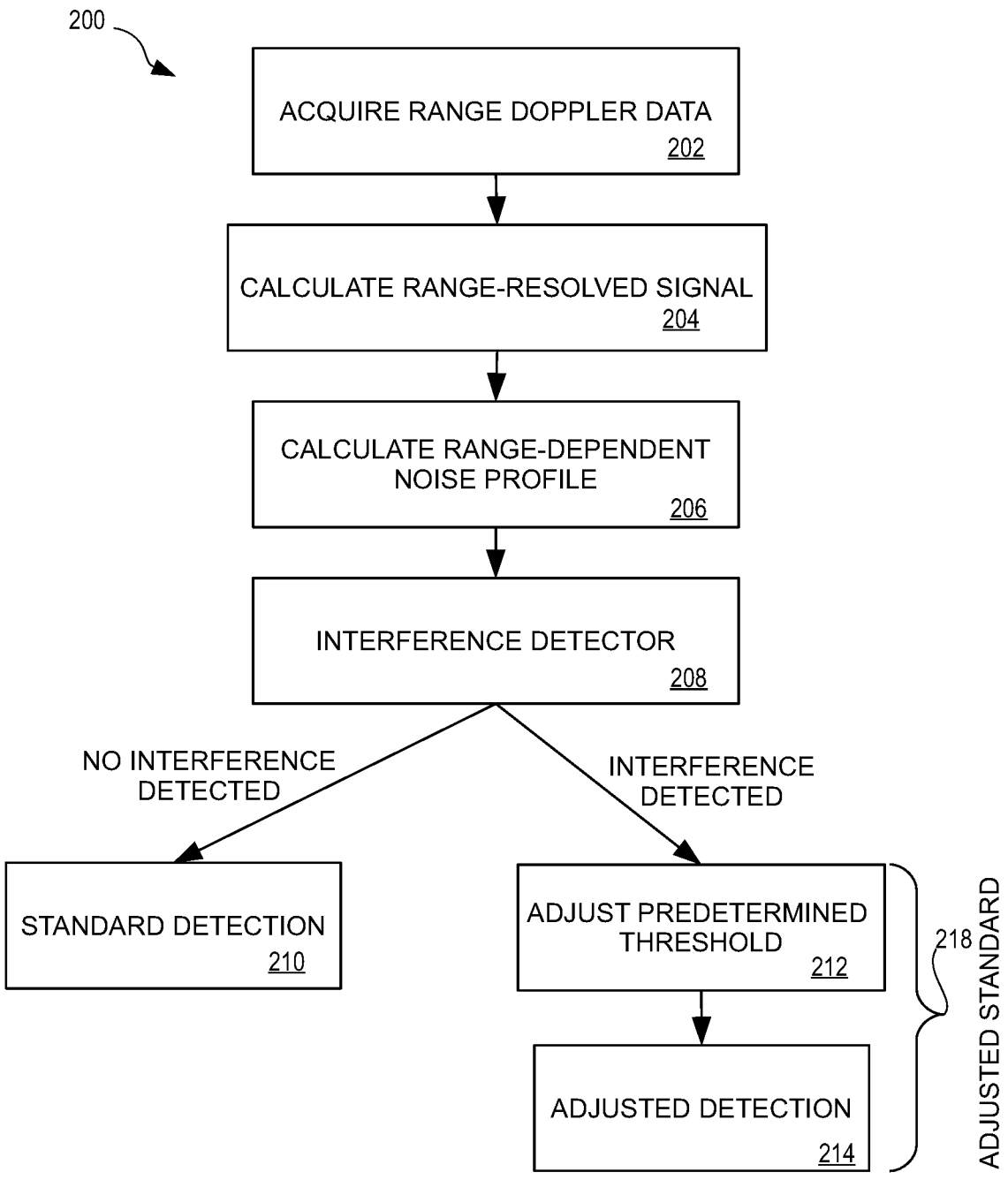
FIG. 6 is a flow chart of a method for identifying that a first radar unit of FMCW type is subject to parallel incoherent interference from a second radar unit of FMCW type according to embodiments.

At this point all building blocks of the present invention have been described and a method 200 according to one embodiment can be more readily understood. Such a method will be described referring to FIGS. 5-9, starting with FIG. 6 illustrating the base of the method.

In a first step 202, range-Doppler data is acquired for the surveilled scene, generating the range-Doppler map 202 of FIG. 4. At this time an exclude area may defined around the zero Doppler shift line, so as to remove echoes originating from stationary objects not to be included in the further calculations (since they are of less importance from a surveillance perspective). This step and further calculation steps may, e.g., be performed by the radar processing unit 166 (see FIG. 3) or the central processing unit 168. It is obviously possible to perform these calculations outside of the radar, yet from an efficiency standpoint it is beneficial to process the data locally. As mentioned before, this step is reasonable in the present context and has its advantages, but it would still be considered optional. In step 204 a range-resolved signal is calculated, for the left side and the right side of the range-Doppler map (which may or may not include the zero-Doppler line for both sides). The range-resolved signal is a measure of the signal for each range, which may be any suitable measure, such as an average, a median, a sum, etc.

Figure 7:
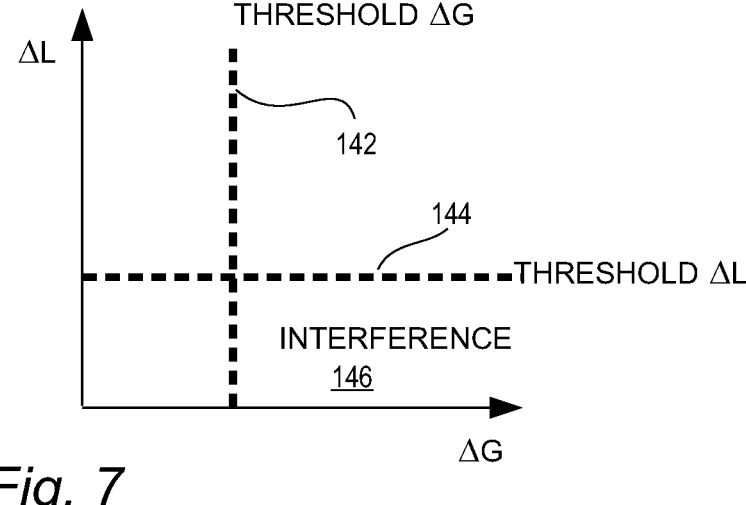
FIG. 7 schematically illustrates a graph relating to interference detection in embodiments of the present invention.

In step 206 a range-dependent noise profile is calculated. This is performed by taking, for each range or range interval, the smaller of the left and right range-resolved signal. Selecting the smaller value as a measure of the background signal is self-explanatory, since any object detection would result in an increased signal level. The next step, step 208, is to detect instances of incoherent interference within a frame, which is illustrated in FIG. 7, showing the working principle of an embodiment of the interference detector. FIG. 7 discloses a parameter called ΔL as a function of a parameter called ΔG, where:

$$\Delta L = \frac{1}{n}\sum_{i=1}^{n}\left|N_{LL}(r_i) - N_{LR}(r_i)\right|, \text{ and}$$

$$\Delta G = \frac{1}{n}\sum_{i=1}^{n}(\min(N_{LL}(r_i), N_{LR}(r_i)) - G_N).$$

ΔL is a measure of the deviation between the left and the right range-resolved signal. This may be calculated by averaging the deviation for each range $r_i$, as in the present embodiment, or separately for each range or range interval. Due to noise the latter two may be too affected to give a reliable value. In either case, the difference will be small if there is no object present, since either both sides will be low and similar (in the absence of incoherent interference) or high and similar (in the presence of incoherent interference). The parameter called ΔG is a measure of the difference between the range-dependent noise profile $\min(N_{LL}, N_{LR})$ and the global noise floor $G_N$. It will, for the same range or range interval as ΔL, take the lowest of the left and right value (i.e., the previously mentioned range-dependent noise profile) and compare it to the global noise level. This comparison may also be performed at different resolutions (an average of the difference for all ranges, or for each range $r_i$ or range interval). For the present embodiment an average of all ranges are used, as was the case for $\Delta L$. FIG. 7 shows how these two values are combined. Incoherent interference will result in that $\Delta L$ is small, so we can say that if it is too big, it is a strong indication that we have no incoherent interference, and thus set a condition that it should be lower than a threshold for $\Delta L$, $th_{\Delta L}$144. $\Delta G$ will in turn safeguard that a small $\Delta L$ actually is based on incoherent interference. If the difference between the lower of the left and right local noise level and the global noise level is small, there is no effect from incoherent interference for that range or range interval. Consequently, we can add the additional condition that $\Delta G$ should be larger than a threshold for $\Delta G$, $th_{\Delta G}$ 142. If these two conditions are fulfilled, i.e., if we end up in the lower right quadrant 146 of the graph of FIG. 7 it can be deduced that incoherent interference affects that frame (or range or range interval).

If a range-resolved difference were to be used in the above calculations the occurrence of incoherent interference in a particular range or range interval would render the frame being evaluated labelled as being affected by incoherent interference.

The repeated use of "range or range interval" is based on that the processing may be performed at the maximum range resolution of the radar unit or its maximum processing resolution, i.e., with the smallest possible increments (this would be "range"), or at a lower resolution where range intervals are combined (this would be "range interval". The latter of course resulting in a lower computational load. These terms may also be referred to as different size "range bins". For the purposes of a practical embodiment, given the present signal levels and detector quality, this part of the method is performed on frame level, i.e., the range interval comprises all, or at least most, ranges of the frame.

After this step, as described earlier, it has been deduced if there is incoherent interference or not, and if there is, adjustments should be made.

If no interference is detected the method proceeds to step 210, where objects are detected from the range-Doppler map using a predefined detection threshold. In more detail, if the value in a cell of the range-Doppler map exceeds the predefined detection threshold the echo will be classified as a detected object. The predefined detection threshold may be set to decline with range, but this is not a necessary condition. Further, the predefined threshold may be set in relation to the global noise level, such as a predefined level above the global noise level, wherein the predefined level may or may not decline with range.

If, however, interference is detected the method will enter a branch 218 of an adjusted standard object detection, where the predefined detection threshold is adjusted to account for the incoherent interference. The threshold is adjusted in step 212, e.g., with the method described referring to FIGS. 8-10 (below). In the following step 214 the adjusted predetermined threshold is used for object detection.

By using the inventive method according to this embodiment 1) the increased signal level due to incoherent interference will not result in a false object detection, and 2) true objects present at the range affected by incoherent interference may still be detected.

Figure 8:
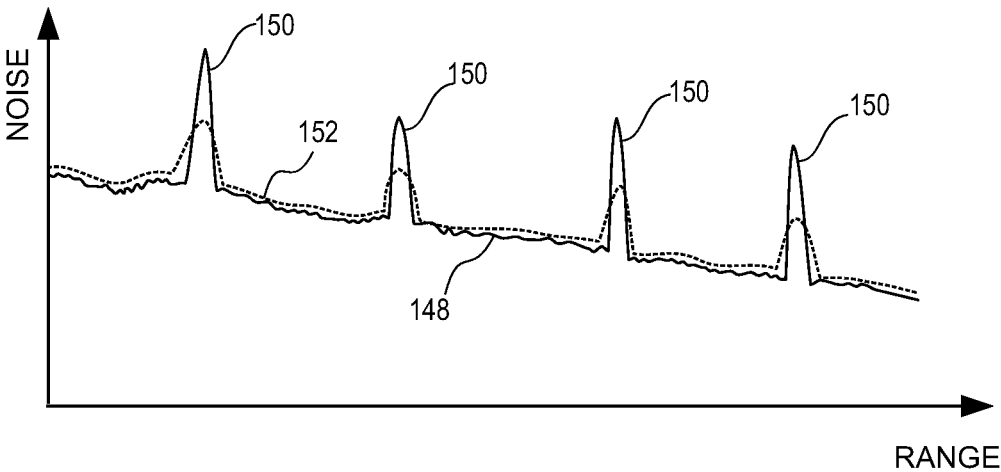
FIG. 8 schematically illustrates a graph of an evaluated noise level as a function of range, and a low-pass filtered version of the same graph.
Figure 9:
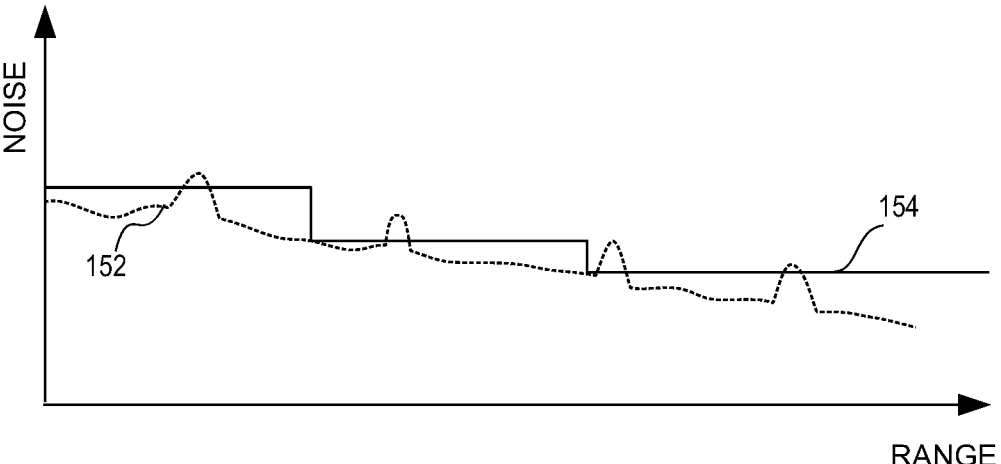
FIG. 9 schematically illustrates a preset detection threshold and the low-pass filtered version of FIG. 7.

One way of effecting the adjustments is presented referring to FIGS. 7-9 all representing graphs of noise as a function of range, and its effect on a detection threshold. The graph of FIG. 8 illustrates the previously mentioned parameter min($L_{NL}$, $L_{NR}$), this time as a function of range (full line, 148), i.e. the range-noise profile. The peaks 150 indicate range sections where it may have been affected by incoherent interference and the same reference numeral has been used for every peak. The hatched curve 152 is a low-pass filtered version of the full-line curve 148, where the sharp peaks have been smoothened out a bit to account for a poor signal to noise ratio in a single measurement.

Figure 10:
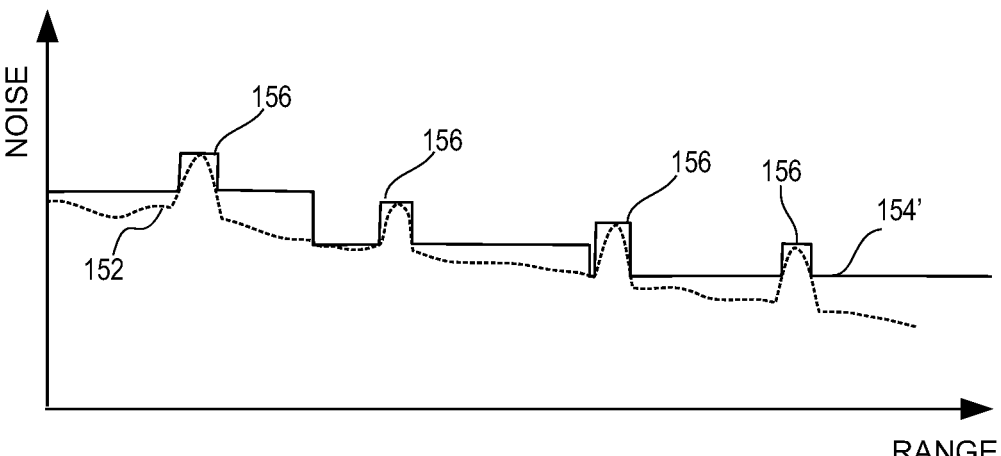
FIG. 10 schematically illustrates how the preset detection threshold of FIG. 9 has been adjusted based on the low-pass filtered version shown in FIG. 8.

FIG. 9 is similar to FIG. 8 and in that graph the aforementioned low-pass filtered curve of FIG. 8 is compared to an original, predetermined detection threshold 154. In this example, the detection threshold 154 is range-dependent, where the detection threshold is reduced as a function of range, as previously mentioned. In other examples, the detection threshold 154 may be constant. If and how the range-dependent detection threshold decreases may depend on detector type and the resolution, signal to noise ratio, etc. As such it is not to be interpreted as a prerequisite and the example in FIG. 9 is merely a schematic illustration. It is evident that the low-pass filtered curve exceeds the predefined range-dependent detection threshold 154 in some range sections, which means that the latter needs to be adjusted to avoid false detections. FIG. 10 illustrates a straightforward way of performing such an adjustment. Basically, the threshold 154 is adjusted with step functions 156 so as to ensure that it includes the locally increased noise level, resulting in an adjusted range-dependent detection threshold 154'.

Consequently, the present invention, in various embodiments thereof, may be used to localize ranges affected by incoherent interference, to disregard from these localized ranges during evaluation, or to adjust a threshold for these areas so as to enable object detection in these localized ranges. In the present embodiment the localization of incoherent interference is performed on a frame level while the adjustment is made on a range level within that frame.

In the above a method of handling incoherent interference has been described. The method is so potent that it renders incoherent interference less detrimental than some other types of interference, such as coherent interference. Another inventive concept is therefore to bias interferences towards being incoherent interference so that the inventive method may work properly. Given that a static radar installation, e.g., of the type exemplified in FIG. 1, this may be done in advance. It may, however, also be performed in a situation where interference is detected.

In such a method a radar unit detecting interference, either automatically or as observed as an operator, may shift its inter-chirp idle time towards a longer or a shorter time, after which the impact of interference may be evaluated again.

In a radar system where several radar units are in the control of an operator, the shift in inter-chirp idle times may be more elaborate than the empirical approach above, i.e., in a radar system overview the inter-chirp idle time of radar units that could theoretically interfere with each other could be set to different values for each such radar unit.

It will be appreciated that a person skilled in the art can modify the above-described embodiments in many ways and still use the advantages of the invention as shown in the embodiments above. For example, when the radar unit has several transmit and receive antennas, the described method may be performed for each transmit and receive antenna combination. Thus, the invention should not be limited to the shown embodiments but should only be defined by the appended claims. Additionally, as the skilled person understands, the shown embodiments may be combined.

The invention claimed is:

1. A method for identifying that a first radar unit of frequency-modulated continuous-wave, FMCW, type is subject to parallel incoherent interference from a second radar unit of FMCW type, comprising:

acquiring a range-Doppler map corresponding to a time frame in which the radar unit was activated to transmit and receive signals, wherein the range-Doppler map includes signal values for a plurality of range intervals and a plurality of Doppler shifts, calculating a range-resolved signal for a negative half and a positive half of the range-Doppler map, wherein the negative half and the positive half of the range-Doppler map correspond to negative and positive Doppler shifts, respectively, calculating a range-dependent noise profile for the range-Doppler map as, for each range interval, the smaller of the range-resolved signal for the negative half and the positive half, identifying parallel incoherent interference in the range-Doppler map if:

a measure of a deviation between the range-resolved signal for the negative half and the positive half is smaller than a predetermined deviation threshold, and a measure of a difference between the range-dependent noise profile and a global noise floor of the range-Doppler map exceeds a predetermined noise threshold.

2. The method of claim 1, further comprising:

in case no interference is identified in the range-Doppler map, detecting targets in the range-Doppler map by comparing the signal values to a predetermined detection threshold, and in case interference is identified in the range-Doppler map, adjusting the predetermined detection threshold, and detecting targets in the range-Doppler map by comparing the signal values to the adjusted predetermined detection threshold.

3. The method of claim 2, wherein the step of adjusting the predetermined detection threshold comprises:

comparing the range-dependent noise profile for the range-Doppler map to the predetermined detection threshold, and generating an adjusted detection threshold by increasing the predetermined detection threshold for range intervals where it is exceeded by the range-dependent noise profile.

4. The method of claim 3, wherein the range-dependent noise profile is subjected to a low-pass filter before it is compared to the predetermined detection threshold.

5. The method of claim 3, wherein the predetermined detection threshold is adjusted such that it exceeds the range-dependent noise profile or a low-pass filtered version thereof.

6. The method of claim 1, wherein the global noise floor is estimated as a running average value of a noise floor in multiple consecutive range-Doppler maps.

7. The method of claim 1, wherein the range-resolved signal for each half of the range-Doppler map is calculated as, for each range interval, a representative value of the range-Doppler signal values for that range interval and for Doppler shifts in that half.

8. The method of claim 1, wherein the measure of the deviation between the range-resolved signal for the negative half and the positive half is a representative deviation between the range-resolved signal for the negative half and the positive half.

9. The method of claim 1, wherein the measure of the difference between the range-dependent noise profile and the global noise floor is a difference between a representative value of the range-dependent noise profile and the global noise floor.

10. The method of claim 1, wherein the first radar unit and the second radar unit have identical chirps, but wherein the second radar unit has a different inter-chirp idle time than the first radar unit.

11. The method of claim 1, comprising the step of adjusting an inter-chirp idle time for the first radar unit so as to increase the likelihood of an occurrence of incoherent interference.

12. A radar unit generating a frequency-modulated continuous-wave, FMCW, and comprising circuitry configured to perform to identify that its FCMW is subject to parallel incoherent interference from a second radar unit generating a second FMCW, comprising:

a receiver for acquiring a range-Doppler map corresponding to a time frame in which the radar unit was activated to transmit and receive signals, wherein the range-Doppler map includes signal values for a plurality of range intervals and a plurality of Doppler shifts, a processor for calculating a range-resolved signal for a negative half and a positive half of the range-Doppler map, wherein the negative half and the positive half of the range-Doppler map correspond to negative and positive Doppler shifts, respectively, the processor calculating a range-dependent noise profile for the range-Doppler map as, for each range interval, the smaller of the range-resolved signal for the negative half and the positive half, and identifying parallel incoherent interference in the range-Doppler map if:

a measure of a deviation between the range-resolved signal for the negative half and the positive half is smaller than a predetermined deviation threshold, and a measure of a difference between the range-dependent noise profile and a global noise floor of the range-Doppler map exceeds a predetermined noise threshold.

13. The method of claim 1, wherein the first radar unit and the second radar unit have identical chirps, but wherein the second radar unit has a different inter-chirp idle time than the first radar unit, so as to promote a generation of incoherent interference before other types of inter-radar interferences.

14. The radar system of claim 13, wherein the first radar comprises means for detecting interference from a nearby radar and for adjusting its inter-chirp idle time so as to promote a generation of incoherent interference before other types of inter-radar interferences.

15. A non-transitory computer-readable medium having computer code instructions stored thereon adapted to carry out a method for identifying that a first radar unit of frequency-modulated continuous-wave, FMCW, type is subject to parallel incoherent interference from a second radar unit of FMCW type, the method executed by a device having processing capability, the method comprising:

acquiring a range-Doppler map corresponding to a time frame in which the radar unit was activated to transmit and receive signals, wherein the range-Doppler map includes signal values for a plurality of range intervals and a plurality of Doppler shifts, calculating a range-resolved signal for a negative half and a positive half of the range-Doppler map, wherein the negative half and the positive half of the range-Doppler map correspond to negative and positive Doppler shifts, respectively, calculating a range-dependent noise profile for the range-Doppler map as, for each range interval, the smaller of the range-resolved signal for the negative half and the positive half, identifying parallel incoherent interference in the range-Doppler map if:

a measure of a deviation between the range-resolved signal for the negative half and the positive half is smaller than a predetermined deviation threshold, and a measure of a difference between the range-dependent noise profile and a global noise floor of the range-Doppler map exceeds a predetermined noise threshold.

* * * * *